Jan. 21, 1969 S. GEORGE 3,422,952

PROTECTIVE RECORD JACKET

Filed Sept. 20, 1967

INVENTOR
STEPHEN GEORGE

BY

ATTORNEY.

United States Patent Office 3,422,952

Patented Jan. 21, 1969

3,422,952

PROTECTIVE RECORD JACKET

Stephen George, 247 Swinton Ave., Bronx, N.Y. 10465

Filed Sept. 20, 1967, Ser. No. 669,043

U.S. Cl. 206—62 4 Claims

Int. Cl. B65d *81/16; 85/30*

ABSTRACT OF THE DISCLOSURE

A record jacket for protectively and securely gripping a disc type phonograph record for storage in which the jacket is formed of the conventional square open-ended envelope type. In order to provide desired cushioning of the record within the jacket, the interior surface of the jacket is flocked, and in order to insure retention of the record within the jacket, and prevent inadvertent slippage of the record from the jacket, the interior corners of the jacket are glued to restrict the interior opening of the jacket, thereby increasing the gripping action of the jacket with respect to the inner end of the record within the jacket.

*Background of the invention*

Disc type phonograph records are generally distributed in a record jacket in the form of an open ended square envelope dimensioned to accommode the record within the jacket. These jackets are generally fabricated of cardboard, or the like paper board stock and are printed, or covered with a paper wrapper imprinted with desired promotional and informative indicia. The interior of the jacket envelope is relatively smooth, and facilitates the ready removal of the record from the jacket for playing and insertion into the jacket for distribution and storage.

During movement of the record containing jacket, the record shifts within the jacket and the relative rubbing between the interior of the record jacket, and the record surface is not only physically damaging to the record grooves, but also serves to generate a static electric charge on the record surface acting to attract dust particles into the record jacket and onto the record surface. In order to minimize the relative rubbing between the interior of the record jacket and the record surface, the records have first been inserted into an auxiliary paper or plastic envelope or sleeve, before insertion into the record jacket, with a resultant increase in packing costs, and an increase in the manipulative steps required to remove the record for playing, and reinsert same for storage.

Notwithstanding the use of these auxiliary envelopes or sleeves, it is found that the record is still subject to damage as a result of shifting of this auxiliary sleeve, within the jacket, and from shock damage, as when the jacket is dropped or inadvertently hit. Additionally, one of the major problems encountered in connection with the use of record jackets for storing records resides in the fact that the dimensioning of the record jacket which must of necessity be such as to freely accommodate the record for insertion into the jacket, is such as to permit the record to fall from the jacket in the event that the record jacket with the record is picked up with the open end of the jacket facing downwardly.

It is with the above problems and considerations in mind that the present improved record jacket has been evolved in which a protective record jacket is provided with means cushioning the record against shock load, and serving to retain the record in the jacket once the record is there positioned, without requiring the use of auxiliary envelopes, thereby minimizing the manipulative steps required to effectively protect the record during storage.

It is accordingly, among the primary objects of this invention to provide an improved record jacket with means preventing accidental slippage of the record from the jacket.

A further object of the invention is to provide a record jacket in which slippage of the record within the jacket is minimized after it has once been inserted to thereby prevent damage to the record surface.

A further object of the invention is to provide a record jacket serving to produce minimal static electric charges on the record surface, thereby minimizing dust collection.

Another important object of the invention is to provide a record jacket serving to cushion and retain the record in protected position without requiring the use of auxiliary envelopes.

These and other objects of the invention which will become hereafter apparent, are achieved by forming a record jacket with a flocked interior surface. The flocking is coated with a static eliminating material. The record jacket is formed of a conventional square open ended envelope configuration, with the dimensions of the square being such as to accommodate the conventional circular disc type phonograph record permitting its free insertion and removal from the envelope. At the inside corners of the envelope, the possible spacing between the side walls such as could be obtained in the bowing of the envelope to permit the insertion of the record is reduced by gluing the interior corners together, thereby reducing the length between interior corners and reducing the available bow of the jacket, as a result of which the inner end of the record within the jacket is relatively securely gripped.

A feature of the invention resides in the fact that it may be formed of a single sheet of flocked paper board, serving to securely engage the record within the jacket, and as a result of which the conventionally employed auxiliary envelopes need no longer be provided or used.

*Brief description of the drawings*

The specific details of a preferred embodiment of the invention, and their mode of functioning will be made most manifest, and particularly pointed out in clear, concise and exact terms in conjunction with the accompanying drawings, wherein.

Referring now more particularly to the drawings, like numerals in the various figures will be employed to designate like parts.

Figures 1, 2, 3, 4, 5, 6:
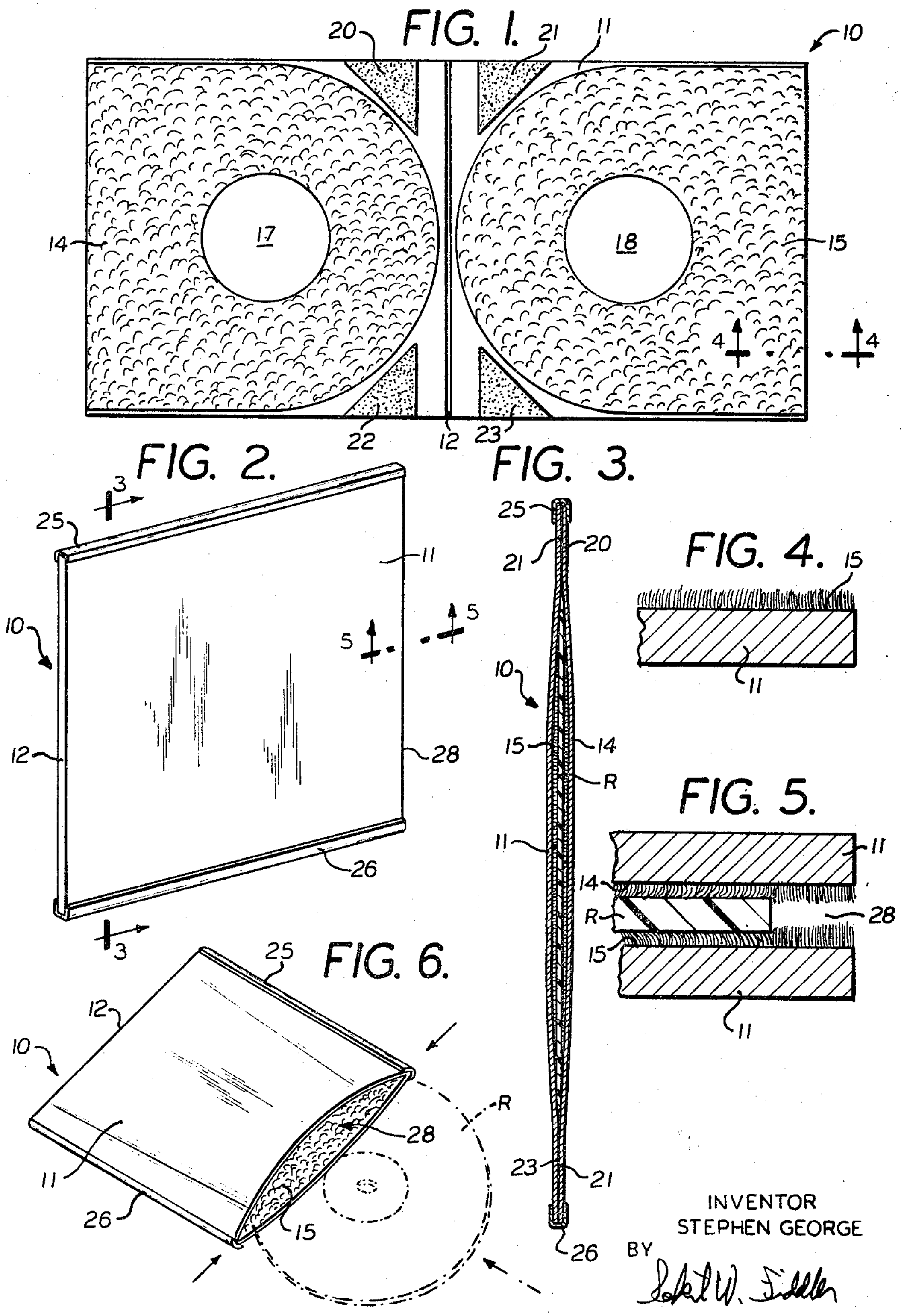
FIG. 1 is a plan view of a record jacket blank shown open to reveal the areas of flocking and gluing.
FIG. 2 is a perspective view of an assembled record jacket made in accordance with the teachings of this invention.
FIG. 3 is a cross-sectional view on line 3—3 of FIG. 2 through the inner end of the record jacket showing the limited bowing of the jacket to grip the record within the jacket.
FIG. 4 is a cross-sectional view on line 4—4 of FIG. 1 showing the flocking.
FIG. 5 is a cross-sectional view taken on line 5—5 of FIG. 2 indicating the relationship of flocked inner surface of the record jacket to the record.
FIG. 6 is a perspective view illustrating how the open end of the jacket is bowed to permit insertion of the record therein.

The novel protective record jacket 10, made in accordance with the teachings of this invention, is shown in assembled relationship in FIGS. 2 and 6.

In the illustrated preferred embodiment, the record jacket 10 is formed of a rectangular blank of sheet material 11, as seen in FIG. 1, having a width slightly larger than the diameter of the record to be enclosed, and a length slightly greater than twice the diameter of the record. In a commercial embodiment, in producing a jacket for use in connection with twelve inch records, the length of the blank of sheet material will be 24⅞ inches, and the width 12⅜ inches. The sheet material may be any one of a wide variety of sheet materials, paper board stock presently being used for these purposes. A .028 caliber paper lined chip board has been satisfactorily employed in connection with the commercial embodiment. A spine forming center fold 12 formed by a ⅛ inch wide score line is provided at the center of the rectangular blank.

The surface of the blank, which will form the interior of the record jacket, is flocked. Any one of a wide variety of flocking materials, and flocking techniques may be employed. However, it is preferred that a shedless flocking technique, such as disclosed in applicant's copending application S.N. 336,687 be employed to apply cotton flock of a thickness of between .006 and .010 inch to the surface. It is preferred that the flock be given an antistatic treatment, such as by the use of a variety of commercially available products as produced by the Drew Chemical Corp. of New York, N.Y., e.g., Drustat 75.

Though the flock may be applied over the entire surface of the blank to be folded into the interior surface of the jacket, for purposes of economy, the flocked areas may be reduced to cover only those surfaces which will come into contact with the grooved surface of the record when positioned in the jacket, as illustratively shown in FIG. 1. The flocked surfaces 14 and 15, as illustratively shown, extend from the free ends of the blank, and the center circular portions 17 and 18 which will lie over the label bearing area of the record are left unflocked. In the illustrated embodiment for use in connection with conventional 12 inch records, the unflocked central circular areas 17 and 18 will have a diameter of approximately 4½ inches, with the circular arcuate portion having a radius of 6 inches from the center of the circular areas 17 and 18.

Glue areas 20, 21, 22 and 23 are provided, as shown in FIG. 1. These glue areas are coated with a contact cement, or with any one of a wide variety of adhesives which will result in the overlapping glue areas 22 and 23; and 20 and 21 respectively being held together, as shown in FIG. 3, when the blank 11 is folded over on itself along the score line 12 to form the jacket 10 with two square shaped walls.

In assembling a preferred embodiment of the invention, as illustrated, the blank 11 is folded over on itself along score line 12 to bring the flocked surfaces into abutting relationship, into the orientation shown in FIG. 2. The requisite pressure or heat (in the event of use of thermoplastic adhesive in areas 20, 21, 22, and 23) is applied to the corners adjacent the fold about score line 12 so as to insure adhesion of areas 20 and 21; and areas 22 and 23, respectively to each other.

In the illustrated preferred embodiment, the glue areas 20, 21, 22, and 23 are shown in the configuration of a right isosceles triangle with sides 2½ inches in length, spaced one inch from the score line 12. It will be apparent to those skilled in the art that a variety of other configurations for these glue areas may be employed, the primary consideration being that sufficient space be left between glue areas to permit insertion of a record up to the spine of the record jacket formed about score line 12. An additional consideration in providing for the glue areas is that they preferably do not extend to the score line, since were they to extend to the score line, there is a possibility that they would increase the bulk of the jacket at the scoreline, or interfere with the desired regularity of the spine of the jacket.

After the blank 11 has been folded over to the configuration illustrated in FIG. 2, the edges of the folded over blank extending from the spine formed by score line 12 are secured together, preferably by the use of tapes 25 and 26. As will be understood by those skilled in the art, a variety of different tapes may be employed within the scope of the invention. The open end of the jacket forms mouth 28, as shown in FIG. 6 of a dimension sufficient to accommodate the record R.

*Operation*

The novel record jacket 10 is formed as above described, from blank 11, which is shaped and scored for folding along score line 12 to form the spine of the jacket, after the blank has been provided with the desired flocked surface and glue areas. The folded blank is then secured at the top and bottom edges thereof, as viewed in FIG. 2 by means of tapes 25 and 26, leaving an open end to form the jacket mouth 28.

In use, the jacket is slightly bowed to open the mouth 28 to facilitate insertion of record R into the jacket 10.

As above described, it is preferred that the flocked surface be coated with an antistatic treatment such as is readily provided by a variety of commercial products, such as Drustat 75; Drustat 100–T; or WOR as produced by the Drew Chemical Corp. of New York City.

The lint free, non static flocked interior surface, in passing over the surface of the records as the record is inserted into the jacket, serves to clean the record surface. Thereafter, when the jacket is released from its bowed orientation to permit it to return to normal position, the grooved surface of the record is engaged by the flocked areas, as seen in FIG. 5. The flocked surface serves the twofold function of cushioning the record in the jacket, thus minimizing any danger from shock as might result from dropping the record jacket, and serves to substantially seal the record grooves from contamination by dust inadvertently entering the record jacket.

As a result of the construction of the interior corners of the interior record jacket, as shown in FIG. 3, the record at the interior end of the jacket is more firmly gripped than at the areas remote from the inside corners. This increased gripping action serves to minimize the possibility of the record shifting in the jacket during normal movement of the jacket, and additionally, serves to minimize the possibility of the record falling from the jacket should it be held with the mouth downwardly.

Removal of the record from the jacket requires the bowing of the jacket to the position illustrated in FIG. 6, with the exertion of a positive force on the record to free it from its engagement with the flocked surfaces at the interior of the jacket.

What is claimed is:

1. A protective record jacket comprising a pair of square shaped walls joined along three sides thereof and open along a fourth side to form an open mouth; and an adhesive between the interior corners of the jacket restricting the possible opening of the interior end of the record jacket, as compared to the opening across the mouth.

2. A protective record jacket, as in claim 1, formed from a rectangular blank of sheet material scored to form a transverse fold line.

3. A protective record jacket, as in claim 1, in which the interior of the jacket is flocked on all surfaces engaging the record grooves of a disc phonograph record when in position within said jacket.

4. A record jacket, as in claim 1, in which said adhesive is positioned in glue areas spaced from the interior edge of the jacket, and spaced from the interior edge of a record positioned within said jacket.

References Cited

UNITED STATES PATENTS

| | | | |
|---|---|---|---|
| 1,132,972 | 3/1915 | Ralph. | |
| 2,225,048 | 12/1940 | Hasin. | |
| 3,224,573 | 12/1965 | Way | 206—62 |

JAMES B. MARBERT, *Primary Examiner.*